Sept. 14, 1965

M. J. DI TORO 3,206,688

APPARATUS FOR CORRECTING DISTORTION IN WAVE-SIGNAL TRANSLATING CHANNELS

Filed June 8, 1962

4 Sheets-Sheet 1

Sept. 14, 1965 M. J. DI TORO 3,206,688

APPARATUS FOR CORRECTING DISTORTION IN WAVE-SIGNAL TRANSLATING CHANNELS

Filed June 8, 1962 4 Sheets-Sheet 3

United States Patent Office 3,206,688

Patented Sept. 14, 1965

3,206,688

APPARATUS FOR CORRECTING DISTORTION IN WAVE-SIGNAL TRANSLATING CHANNELS

Michael J. Di Toro, Massapequa, N.Y., assignor to Cardion Electronics, Inc., a corporation of Delaware Filed June 8, 1962, Ser. No. 201,148
19 Claims. (Cl. 328—165)

This invention relates to apparatus for correcting waveform distortion in wave-signal translating channels and particularly to such apparatus suitable for correcting a signal comprising a primary pulse and spurious minor side pulses with substantial suppression of the spurious pulses.

In applicant's prior copending application Serial No. 180,456, filed March 19, 1962, there is described and claimed an apparatus for minimizing waveform distortion in wave-signal translating channels, particularly data transmission channels. That application is directed to the solution of a problem arising from the fact that most conventional wave-signal translating channels have a nonlinear phase-frequency or time delay-frequency translation characteristic which gives rise to waveform distortion or dispersion of electrical pulses or signals used in data transmission. For example, in the case of data transmission, it has been established that a translating system having a moderate signal-to-noise ratio and a linear phase-frequency characteristic to a cutoff frequency $f_c$ can translate, without intersymbol interference, pulses of various amplitudes at the rate of $2f_c$ pulses per second. Most current data transmission systems achieve only a fraction of the foregoing pulse rate because their nonlinear phase-frequency characteristic causes dispersion or lengthening in time of each pulse transmitted, much beyond the theoretical value of $\frac{1}{2}f_c$. It has been shown that this dispersion is caused not only by the nonlinear phase-frequency characteristic of the channel but also by large slopes of its amplitude-frequency response characteristic.

The apparatus described in aforesaid copending application is effective to minimize distortion of a translated signal arising from the nonlinear translating characteristics described. Nevertheless, the signal output of such an apparatus developed in response to the transmission of an input ideal pulse comprises a primary pulse accompanied by a plurality of spurious minor side pulses or ripples which may or may not be symmetrical with respect to the primary pulse.

It is an object of the invention, therefore, to provide a new and improved apparatus for correcting distortion in wave-signal translating channels which is effective to translate a signal comprising a primary pulse and spurious minor side pulses with substantial suppression of the spurious pulses, for example, a pulse such as that resulting from signal processing by the apparatus described and claimed in aforesaid copending application.

In accordance with the invention, there is provided an apparatus for translating a signal comprising a primary pulse and spurious minor side pulses with substantial suppression of the spurious pulses comprising an input circuit for supplying a signal to be translated, an output circuit, and a wave-signal transmission line coupled to the signal-input circuit, having a predetermined time delay and provided with a central connection tap and a plurality of connection taps symmetrically arranged relative to the central tap. The apparatus further comprises means for sensing the instantaneous signal voltage at the central tap and at each of the plurality of taps on one side thereof in response to the distribution of an input signal along the transmission line, means responsive to the polarity of such instantaneous signal at each given one of the plurality of taps for coupling the corresponding symmetrically disposed tap to the output circuit with a polarity opposite to that of the signal at the given tap, and means for adding to the signals supplied to the output circuit by the last-named means the signal appearing at the central tap.

For a better understanding of the present invention, together with other and further objects thereof, reference is had to the following description taken in connection with the accompanying drawings, while its scope will be pointed out in the appended claims.

Referring now to the drawings:

FIG. 5 is a schematic diagram of a portion of the apparatus of FIG. 4 for processing signals at a center terminal and at two terminals symmetrically spaced with respect to the central terminal of the apparatus of FIG. 4; while

Figure 1:
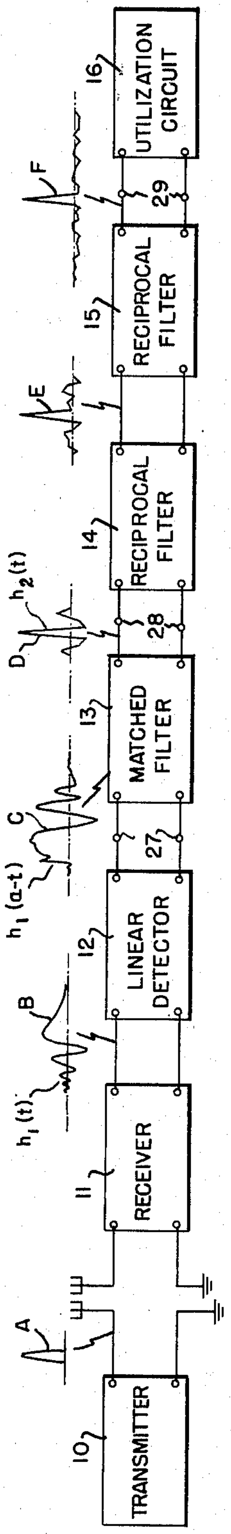
FIG. 1 is a schematic representation of a complete signal communication system of the type in which distortion-correcting apparatus embodying the invention may be suitably incorporated.

Referring now to FIG. 1 of the drawings, there is shown schematically a complete communication system in which the correcting reciprocal filter of the invention may be utilized. The system of this figure comprises a transmitter 10 which is assumed, during an initial test interval prior to transmission of data, to send out a pulse-modulated carrier wave having an envelope represented by curve A. It is assumed that this signal is translated over a dispersive and/or a multipath medium, that is, one having a nonlinear phase-frequency translating characteristic and/or a nonconstant amplitude-frequency characteristic. This signal is picked up at a receiver 11 and delivered as a modulated carrier wave, the envelope of which is represented by curve B which, in turn, may be a representation of the function $h_1(t)$. The signal of curve B is passed through a linear detector 12 which develops a video or baseband signal, also of the waveform B. It will be noted that the waveform of curve B represents a substantial dispersion of the waveform of curve A. In fact, designating the Fourier transform of $h_1(t)$ as $H_1(p)=A(f)\epsilon^{-jB(f)}$, it was shown in applicant's aforesaid copending application that the dispersion $\Delta t$ of the function $h_1(t)$ may be calculated by the relation:

$$(\Delta t)^2=4\pi\frac{\int_0^\infty\left[A^2\left(\frac{d\Delta B}{d\omega}\right)^2+\left(\frac{dA}{d\omega}\right)^2\right]d\omega}{\int_0^\infty A^2 d\omega} \quad (1)$$

where:

$A$=the amplitude-frequency response of the dispersive signal-translating channel, $B$=the phase-frequency response of the channel, and $\Delta B$=the phase error of the channel.

To decrease the dispersion $\Delta t$, it is necessary to decrease the frequency-averaged value of the weighted group delay distortion $A^2(d\Delta B/d\omega)^2$ or to decrease the phase distortion ΔB and to decrease the frequency-averaged value of $(dA/d\omega)^2$.

The signal output $h_1(t)$ of detector 12 is impressed upon a matched filter 13 of the type described and claimed in applicant's aforesaid copending application and having a transfer characteristic represented by curve C which, in turn, may be a representation of the function $h_1(a-t)$, where $a$ is a constant. The frontier transform of $h_1(a-t)$ is $A(f)\epsilon^{+jB(f)}\cdot\epsilon^{-ja\ (f)}$. The output of the matched filter 13, represented by curve D which is a representation of the function $h_2(t)$, has the Fourier transform $$A(f)\epsilon^{-jB(f)}\cdot A(f)\epsilon^{-j2\pi a(f)}\cdot\epsilon^{+jB(f)}=A^2\epsilon^{-j2\pi a(f)}$$

This has a linear phase-frequency response and an amplitude-frequency response of $A^2(f)$. It will be noted that curve D indicates a pronounced primary pulse corresponding to curve A but it also includes a number of side pulses or ripples of substantial amplitude which may be troublesome, particularly when the channel is used to transmit a series of closely spaced pulses.

The signal output $h_2(t)$ of the matched filter 13 is impressed upon a reciprocal filter 14 embodying the invention and described fully hereinafter. The output of the filter 14 is represented by curve E, in which it will be noted that the amplitudes of the undesired side pulses or ripples are materially reduced. In some systems, a single-stage reciprocal filter may be adequate. However if a more complete elimination of the undesired side pulses or ripples is desired, the output of filter 14 may be impressed upon a second reciprocal filter 15 which produces an output signal represented by curve F which, it is noted, comprises a nearly ideal reproduction of the initial pulse A. This signal may be translated to any desired utilization circuit 16.

It will be noted that curve D, representing the signal output of the matched filter 13, is symmetrical about its main lobe. To those conversant with Fourier transforms, it is apparent that this means that the phase distortion ΔB of the signal-translating path has been substantially removed so that the first term within the brackets of the foregoing Equation 1 has been reduced to zero. That is, the resultant phase distortion of the signal-communication channel up to the reciprocal filter 14 has been reduced to an insubstantial value. If the communication channel is one having an insubstantial phase distortion, the matched filter 13 may be omitted.

As indicated, the residual ripples or dispersion of $h_2(t)$ is curve D, whose amplitude-frequency response is now $A^2$, is due to the averaged square value of the second term of Equation 1, $(dA/d\omega)^2$, which, by operation of the matched filter 13, becomes $$4A^2\left(\frac{dA}{d\omega}\right)^2$$

averaged over the pass band. Not that, unlike a factor $(dA/d\omega)^2$ of $h_1(t)$, this new factor $$4A^2\left(\frac{dA}{d\omega}\right)^2$$

of $h_2(t)$ precludes any small-amplitude ripples with large slopes $(dA/d\omega)$ from disturbing the subsequent removal from the signal $h_2(t)$ of its undesirable side pulses. This shows the importance of first eliminating the effect of the phase distortion ΔB by the use of the matched filter, leaving only the term of Equation 1 including the factor $(dA^2/d\omega)^2$ and then, in this order, to process the signal in a reciprocal filter, as described hereinafter. Connecting a matched filter and a reciprocal filter in cascade in reverse sequence will not give the desired result when the signal $h_1(t)$ is such as to have no prominent main pulse. In fact, it is well known that when $h_1(t)$ has no prominent main pulse, then when $h_1(t)$ is passed through a matched filter having a transfer characteristic $h_1(a-t)$, the resulting waveform always comprises a main pulse and lesser amplitude spurious pulses and, accordingly, is in the proper form for the subsequent beneficial application of the reciprocal filter hereinafter described to mitigate the undesirable spurious pulses.

Assume that a first test pulse, curve A, is received by the matched filter 13 to set the taps of that filter, that a second test pulse has been received by the matched filter 13 for correlation purposes to ensure that it has not been set up in response to the receipt of a noise impulse, and that a third test pulse has been received by the matched filter 13 and translated thereby to the reciprocal filter 14 with a waveform represented by curve D, as described in applicant's aforesaid copending application. If the system is essentially a noise-free system, the correlation circuits of the matched filter 13 may be omitted, in which case the second test pulse will be translated to the reciprocal filter 14. It is the function of reciprocal filter 14 to pass the main pulse of curve D while substantially reducing or eliminating the side pulses or ripples of this signal. This can be done in one or several stages, as described above.

Before taking up the specific circuitry of the reciprocal filter embodying the present invention, it is believed that it would be helpful to provide a theoretical analysis on which the design of the filter is based.

The waveform $h_2(t)$ of curve D may be represented:

$$h_2(t)=h_{20}(t)+\sum_{v=-m}^{v=+m} a_v h_{20}(t-v),\ \text{with } a_0=0 \quad (2)$$

where:

$h_{20}(t)$=functional representation of the main pulse of curve D;

$v$=time displacement of a given side pulse; also the time delay at selected taps of the reciprocal filter used in synthesizing the desired filter response;

$a_v$=the amplitude of given side pulse relative to the amplitude of the main pulse, and $m$=number of said pulses of significant amplitude.

It is clear that each of the summation terms is a functional representation of an undesired side pulse.

The Fourier transform of $h_2(t)$ is:

$$H_2(p)=H_{20}(p)(1+R(p)) \quad (3)$$

where $$R(p)=\sum_{v=-m}^{v=+m} a_v\epsilon^{-vp} \quad (4)$$

where $p=j2\pi f=j\omega$.

Physically, the function $R(p)$ represents the spectrum of the undesired side pulses or ripples of the function $h_2(t)$. An ideal reciprocal filter with transfer function $H_{r1}(p)$ would accept $H_2(p)$ at its input and give as its output only the desired main pulse $H_{20}(p)$. Accordingly:

$$H_2(p)\cdot H_{r1}(p)=H_{20}(p) \quad (5)$$

and $$H_{r1}(p)=1/(1+R(p)) \quad (6)$$

The reciprocal filter of the invention achieves the automatic synthesis of the transfer function $H_{r1}(p)$ as a series of successive approximations based upon the expansion obtained by performing the division indicated in Equation 6:

$$H_{r1}(p)=1-R(p)+R^2(p)-R^3(p)-\dots+(-R^{n-1}(p))/(1+R(p)) \quad (7)$$

In Equation 7, the last term is the remainder of the division indicated in Equation 6. As explained hereinafter, the parameters of the reciprocal filter are selected so that the series of Equation 7 converges and the successive approximations are used until the remainder diminishes to a negligible value. For usual signal-translating channels, it has been found experimentally and analytically that two or three successive approximations are adequate. Accordingly, a first approximation to $H_{r1}(p)$ is a network with a transfer function $(1-R(p))\epsilon^{-pm}$, where $1-R(p)$ are the first two terms of Equation 7 and $\epsilon^{-pm}$ is a delay factor to assure physical realizability.

Figure 2:
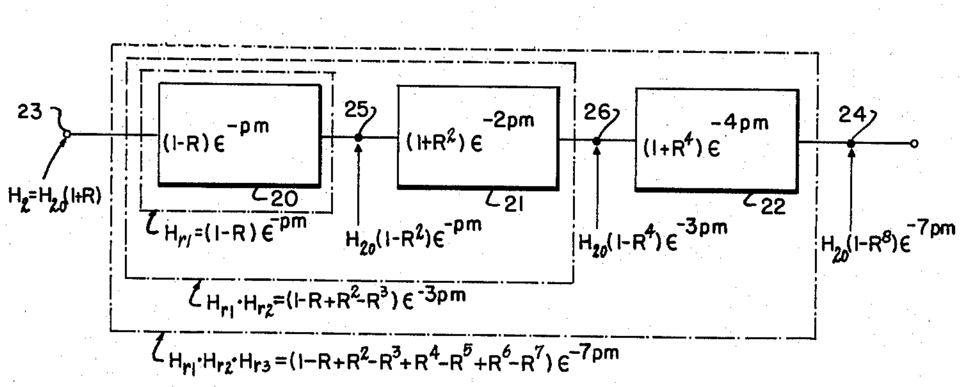
FIGS. 2 and 3 are schematic block diagrams of filter networks to aid in an explanation of the principles upon which the invention is based.

Referring now to FIG. 2 of the drawings, there is schematically represented a series of filter networks connected in cascade for instrumenting Equation 7. For simplicity, the argument $(p)$ has been omitted from the several functional legends applied to FIG. 2 but is to be implied therein. In FIG. 2, there are shown three successive reciprocal networks 20, 21, and 22 connected in cascade between an input terminal 23 and an output terminal 24. The transfer function of each block in FIG. 2 is shown in the block while the output at each terminal is shown thereat for an input $H_2(p)$. As shown in FIG. 2, when a signal $H_2(p)$ is fed into the input terminal 23, the output of the first filter 20 at terminal 25 is $H_{20}(p)\cdot(1-R^2(p))\cdot\epsilon^{-pm}$. This represents the desired main pulse $H_{20}(p)$ with an undesired ripple $H_{20}(p)\cdot R^2(p)$ delay by the factor $\epsilon^{-pm}$, where $\epsilon^{-pm}$ is the symbolic representation of the transfer function of an ideal delay line having a delay of $m$ units. $R(p)\epsilon^{-pm}$ is a representation of the transfer function of a network having a transfer function $R(p)$ in cascade with a network having a transfer function $\epsilon^{-pm}$ and is physically realizable as a single delay line. This undesired ripple may be removed by repeating the process. As shown in FIG. 2, the signal output of the filter 20 is impressed upon a second reciprocal filter 21 having a transfer function $(1+R^2(p))\epsilon^{-2pm}$, the output of which appearing at terminal 26 is $H_{20}(p)\cdot(1-R^4(p))\epsilon^{-3pm}$. It is noted that the transfer function $(1-R(p))\epsilon^{-pm}$ of the filter 20, in cascade with the second filter 21 having a transfer function $(1+R^2(p))\epsilon^{-2pm}$, is $[1-R(p)+R^2(p)-R^3(p)]\epsilon^{-3pm}$. This comprises the first four terms of Equation 7 delayed by the factor $\epsilon^{-3pm}$. Similarly, if the signal appearing at terminal 26 is impressed upon a third reciprocal filter 22 having a transfer characteristic $(1+R^4(p))\epsilon^{-4pm}$, the final output signal appearing at terminal 24 is represented by the function $H_{20}(p)\cdot(1-R^8(p))\epsilon^{-7pm}$. As indicated in FIG. 2, the resultant transfer function of the filters 20, 21, and 22, in cascade, represents the first eight terms of Equation 7 delay by the factor $\epsilon^{-7pm}$.

In brief, the first reciprocal filter 20 of FIG. 2 achieves a first approximation of Equation 7, having a transfer function corresponding to the first two terms thereof; the combination of reciprocal filters 20 and 21 in cascade, having a transfer function represented by the first four terms of Equation 7, achieves a second approximation, while the combination of the filters 20, 21, and 22 in cascade, having a transfer function representing the first eight terms of Equation 7, achieves a third approximation. It is clear that these successive approximations may be continued until the remainder of Equation 7 diminishes to an insignificant value.

Figure 3:
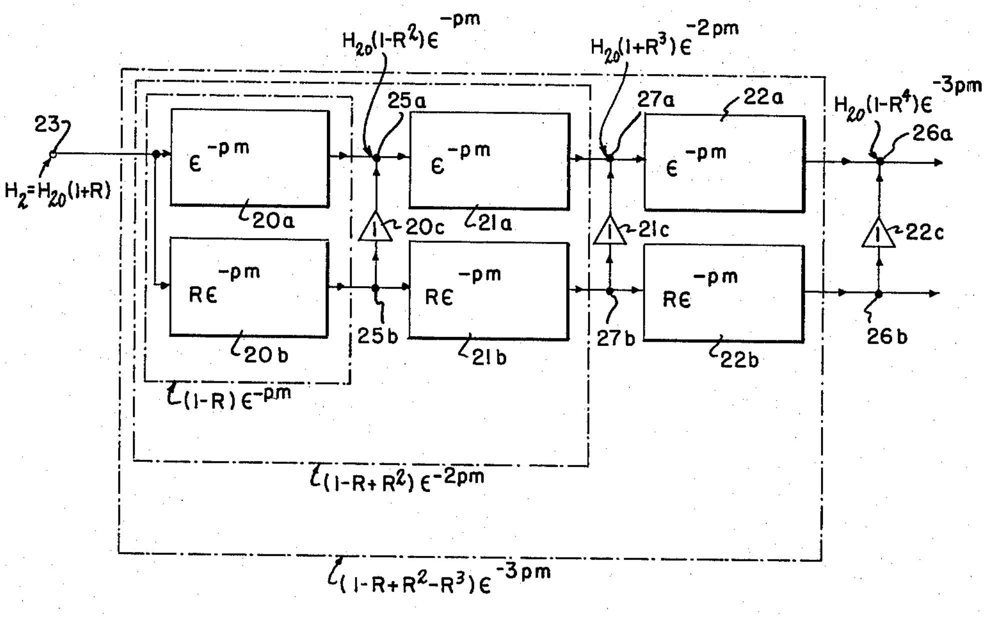

In FIG. 3 is schematically represented a series of filter networks which are an alternative and an equivalent to that of FIG. 2 and have the same resultant transfer function as the first two filter networks of FIG. 2. In FIG. 3, the two cascade-connected filters 20 and 21 of FIG. 2 are replaced by two parallel channels, one comprising the cascade connected filters 20*a*, 21*a*, and 22*a* and the other comprising the cascade connected filters 20*b*, 21*b*, and 22*b*. The successive corresponding junctions 25*a*, 25*b*; 27*a*, 27*b*; and 26*a*, 26*b* are interconnected through unity-gain unidirectional amplifiers 20*c*, 21*c*, and 22*c*, respectively. The transfer function of each of the units of FIG. 3 is represented in its respective functional block. The output signal appearing at terminal 25*a* is $$H_{20}(p)[1-R^2(p)]\epsilon^{-pm}$$

which, it is noted, corresponds to that appearing at terminal 25 of FIG. 2. Likewise, the output signal at terminal 26*a* is $H_{20}(p)[1-R^4(p)]\epsilon^{-3pm}$, which is the same as that appearing at terminal 26 of FIG. 2. The signal at intermediate terminal 27*a* of FIG. 3 is $$H_{20}(p)[1-R^3(p)]\epsilon^{-2pm}$$

Thus, the first reciprocal filter 20*a*, 20*b*, 20*c* of FIG. 3 achieves a first approximation of Equation 7, having a transfer function corresponding to the first two terms thereof; the combination of reciprocal filters 20*a*, 20*b*, 20*c*; 21*a*, 21*b*, 21*c*; and 22*a*, 22*b*, 22*c*, in cascade, having a transfer function representing the first three terms of Equation 7, achieves the next approximation, etc. The principal difference between the networks represented by FIGS. 2 and 3 is that that of FIG. 2 achieves automatic synthesis of $H_{r1}(p)$ in successive steps from successive transmitted test pulses, one for each reciprocal filter stage, while that of FIG. 3 achieves automatic synthesis in all filter stages simultaneously from a single test pulse.

Assuming, for the present, that the filters 14 and 15 of FIG. 1 have the characteristics described, the physical process of evolving a tap-setting recipe for each of the reciprocal filters is quite simple. Assume that the first approximation reciprocal filter 14 is made to have a transfer function:

$$H_{r1}(p)=[1-gR(p)]\epsilon^{-pm} \quad (8)$$

where $g$=the gain of each of the symmetrical side taps of the reciprocal filter, assumed to be unity in the foregoing analysis, and $m$=number of taps, assumed to be equal to the number of side pulses of significant amplitude, as defined above.

The inverse transform of Equation 8 is:

$$h_{r1}(t)=\delta(t-m)-gr(t-m)=\delta(t-m)-g\sum_{v=-m}^{v=+m}a_v\delta(t-v-m) \quad (9)$$

where $r(t)$=inverse transform of $R(p)$, $\delta(t)$=response of an all-pass, zero phase-shift network.

On comparing the $r(t)$ term of $h_{r1}(t)$ in Equation 9 with the corresponding terms of $h_2(t)$ in Equation 2, it follows that the recipe for the first approximation reciprocal filter requires simply that the impulse response $h_{r1}(t)$ of the first reciprocal filter should have the same main pulse amplitude (unity) as that of $h_2(t)$ and that the amplitude of each of the other side pulses or ripples should be the same as all of the other pulses of $h_2(t)$ but of opposite polarity.

Moreover, it has been found that by providing an adjustable tap-gain parameter $g$, a suitable adjustment of $g$ will yield a minimum residual ripple. The output of $H_{r1}(p)$ of Equation 8 to an input of $H_2(p)$ of Equation 3 is:

$$H_2(p)H_{r1}(p)=[H_{20}(p)+H_{20}(p)\cdot R(p)\cdot((1-g)-gR(p))]\epsilon^{-pm} \quad (10)$$

The ripple $[H_{20}(p)\cdot R(p)\cdot((1-g)-gH(p))]\epsilon^{-pm}$ in Equation 10 can be shown to have a least r.m.s. value when the tap gain (other than the unity gain of the center tap) of the first reciprocal filter has an optimum value $g_0$ represented by:

$$g_0=\frac{\int_0^\infty H_{20}^2(p)R^2(p)(1+R(p))df}{\int_0^\infty H_{20}^2(p)R^2(p)(1+R(p))^2df} \quad (11)$$

Each successive reciprocal filter can be given its own optimum tap gain setting. For example, in FIG. 2, the transfer function of the first reciprocal filter 20 would now be $[1-g_{01}R_1(p)]\epsilon^{-pm}$, where $g_{01}$ is set according Equation 11; likewise for FIG. 3, the unidirectional amplifier would have a gain $g_{01}$ rather than the indicated unity gain. Moreover, in FIG. 2, the transfer function of the second reciprocal filter 21 would now be $$[1-g_{02}R_2(p)]\epsilon^{-pm}$$

where $g_{02}$ would be set according to Equation 11 in which now the ripple $R(p)$ would be shown at terminal 25, namely, $-H_{20}R^2(p)\epsilon^{-pm}$, etc. Correspondingly, the gains of all the subsequent unidirectional amplifiers in FIG. 3 can be set to yield the least r.m.s. ripple in the over-all output at terminals 26*a*. There are particular ripple spectra $R(p)$ for which just one reciprocal filter with optimum tap gain $g_0$, greater or less than unity, results in substantially complete elimination of the undesired side pulses. This is true when $R(p)$ has the same constant value over any portion of the pass band.

Referring again to FIG. 1 of the drawings, it will be seen that there is represented a wave-signal translating channel for minimizing waveform distortion of a signal distorted and dispersed by translation through a channel having a translating characteristic represented by the function $h_1(t)$, this distorted input signal, curve B, being supplied to an input circuit comprising terminals 27 while the output circuit of the channel comprises terminals 29 connected to the utilization circuit 16. This channel includes a first wave-signal transmission line, such as the matched filter 13, coupled to the input terminals 27 and having a translating characteristic represented approximately by the function $h(a-t)$, where $a$ is a constant, for converting the input signal of curve B to a signal, curve D, comprising a primary pulse and spurious minor side pulses. The channel also includes a second wave-signal transmission line, for example the reciprocal filter 14, coupled in cascade to the first line.

Figure 4:
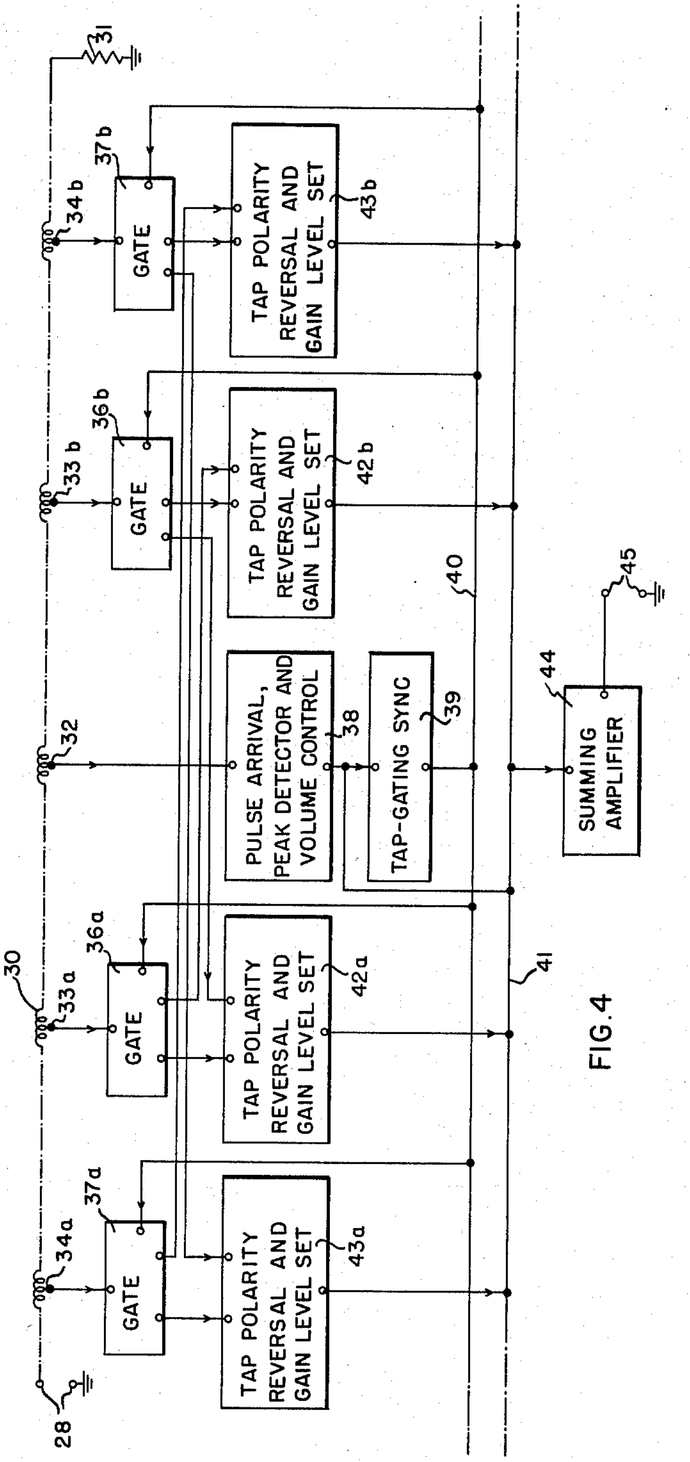
FIG. 4 is a schematic diagram of a portion of a distortion-correcting apparatus embodying the invention.

The reciprocal filter 14 is represented in block form in FIG. 4 as comprising a line 30 connected to input terminals 28 and terminated in an impedance, such as a resistor 31, having a value equal to the characteristic impedance $Z_0$ of the line 30. The line 30 is provided with a central connection tap 32 and a plurality of connection taps 33*a*, 33*b*, 34*a*, 34*b*, etc., the taps with the suffixes *a* and *b* being symmetrically arranged on either side of the central tap 32.

The reciprocal filter of FIG. 4 further comprises means for sensing the instantaneous signal voltage at the central tap 32 and at each of the plurality of taps 33*a*, 33*b*, 34*a*, 34*b*, etc., on either side of the central tap in response to the distribution of an input signal along the line 30. This latter means includes a plurality of transmission gates, such as gates 36*a*, 36*b* and 37*a*, 37*b* connected to the side taps 33*a*, 33*b*, 34*a*, 34*b*, respectively. Connected to the central tap 32 is a pulse arrival, peak detector, and volume-control unit 38 which controls a tap-gating synchronizing source 39 which, as illustrated, is effective via the connection 40 to control the transmission gates 36*a*, 36*b*, 37*a*, 37*b*, etc. Each of the transmission gates 36*a*, 36*b*, 37*a*, 37*b*, etc., is individually connected to an output bus 41 through one of the tap-polarity reversal and gain-level set units 42*a*, 42*b*, 43*a*, 43*b*, respectively, the outputs of these units being connected to a common summing amplifier 44, in turn connected to the output terminals 45. Each of the gates 36*a*, 36*b*, 37*a*, 37*b*, etc., is also cross-connected to the tap-polarity reversal and gain-level set unit associated with a corresponding tap symmetrically located on the opposite side of the central tap 32, as explained hereinafter. Each of the transmission gates 36*a*, 36*b*, 37*a*, 37*b*, etc., thus effectively couples its corresponding symmetrically disposed transmission gate to the common output circuit 41 with a polarity opposite to that of the instantaneous voltage appearing at the gate.

Briefly, in the operation of the system in response to a received test pulse, as represented by curve D of FIG. 1, and upon the arrival of the main pulse of this signal at the central tap 32, the unit 38 conditions the tap gating sync unit 39 to enable all of the transmission gates. For subsequent data signals, all of the instantaneous voltages appearing at the several connection taps, with the polarity of each modified in accordance with the instantaneous voltage at its corresponding opposite tap, are supplied to the summing amplifier 44 and the summation of these several signals, together with that of the main pulse supplied by the central tap 32, apppears at the output terminals 45. Thus, this circuit constitutes an implementation of the first two terms of Equation 7 and a first approximation of an implementation of Equation 2.

Because of the complexity of the system as a whole and because of the fact that normally, in practice, there may be as many as forty or fifty connection taps on each side of the central tap, there have been shown in FIG. 4 the general system connections for only two connection taps on each side of the central tap. The details of the unit 38 and of one of the units 42*a*, 42*b*, 43*a*, 43*b*, etc., which will be duplicated for each of the tap connections of the line, are shown in somewhat greater detail in FIG. 5 of the drawings. Because of the complexity of the interconnections of the various units of FIG. 5 and the separate showings of certain of the units in succeeding figures, it has been found convenient to use lower case letters *a*, *b*, *c*, etc., to identify input and output terminals of the several units as well as the signals appearing thereat and, where an output terminal of one unit is connected directly to an input terminal of another unit, to use the same reference letter to refer to both of these terminals and the connection therebetween.

Figure 5:
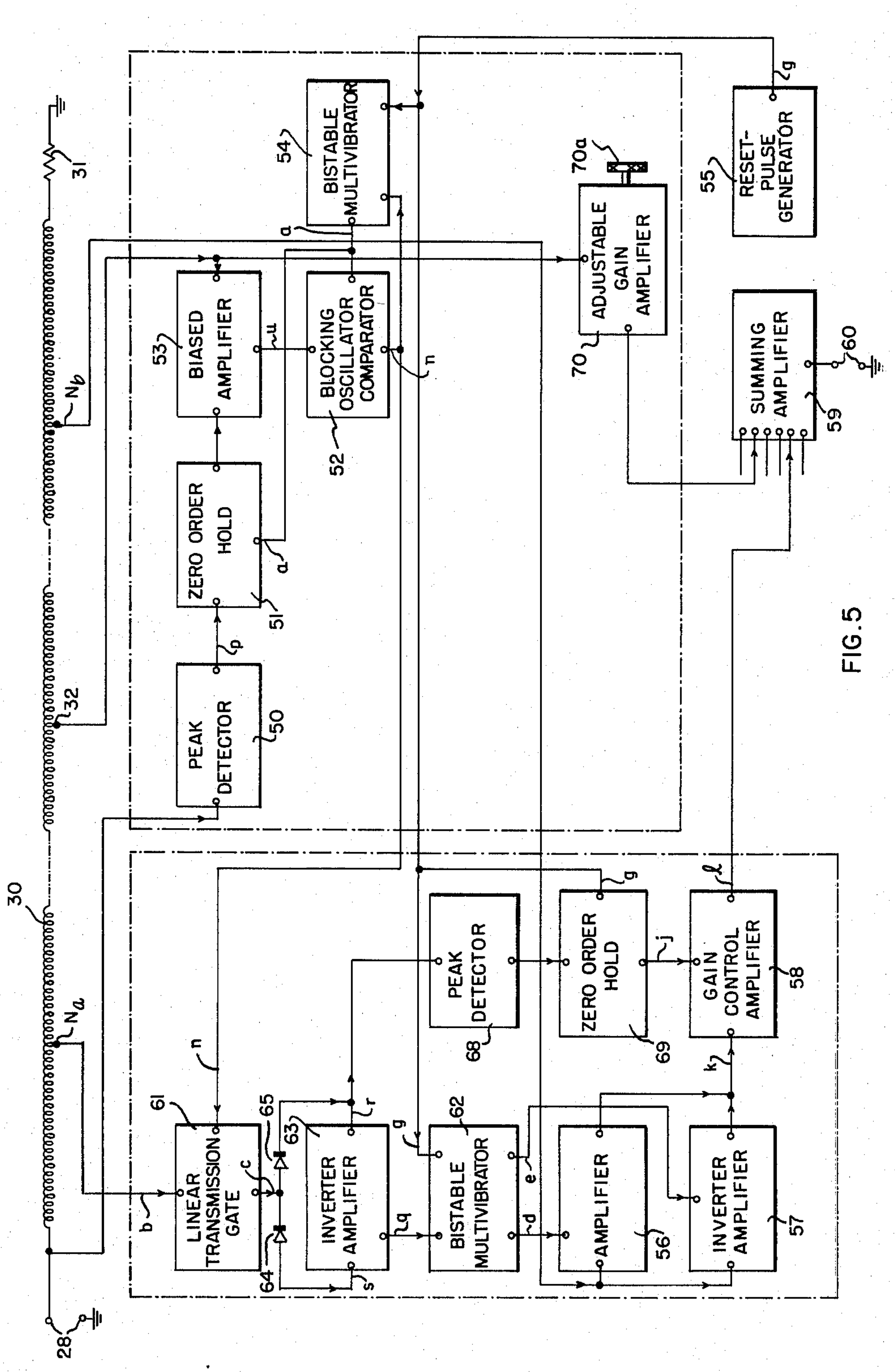

The reciprocal filter of FIG. 5 includes means responsive to the arrival of a primary pulse at the central tap 32 for enabling the transmission gates connected to all of the other connection taps for a predetermined interval. Specifically, this means includes means, such as a conventional peak detector 50, coupled to the input terminals 28 and responsive to the peak value of the signal at the input terminals for developing a control signal. The peak detector 50 is coupled to a zero-order hold unit 51 which receives and stores the control signal from the peak detector 50. The means responsive to the arrival of a primary pulse further includes a blocking oscillator comparator 52, which may be of a conventional configuration, for example, as illustrated and described in Pulse and Digital Circuits by Millman and Taub, McGraw-Hill, 1956, page 473, Figure 15–14. The unit 52 is coupled to the central tap 32 by way of a biased amplifier 53 which, in turn, is coupled to the zero-order hold unit 51. The units 50 and 53 may be of conventional circuit configuration while the unit 51 is illustrated in more detail in FIG. 7, described hereinafter. Its function is to receive and hold the control signal developed by the peak detector 50 and thereby to control the gain of the biased amplifier 53 so as to make it responsive only to the main pulse of the signal appearing at the central tap 32.

The system of FIG. 5 also includes a bistable multivibrator unit 54, also of conventional circuit configuration, for initiating the signal processing in response to a reset pulse from a reset pulse generator 55. The latter unit 55 may be any conventional circuit for developing a single pulse. This pulse is generated just prior to the receipt of the input signal represented by curve D of FIG. 1.

Figure 6:
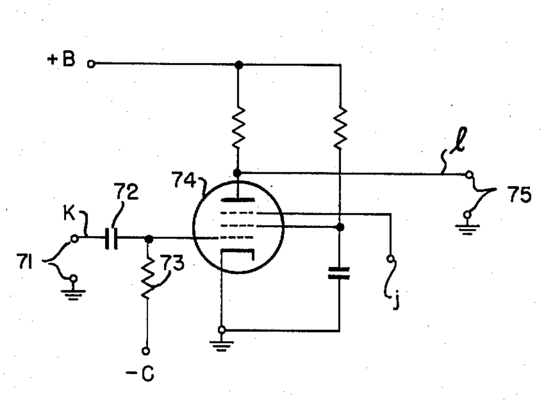
FIGS. 6 and 7 are circuit diagrams of certain of the component elements of the apparatus of FIG. 5.

The reciprocal filter of FIG. 5 further comprises means responsive to the polarity of the instantaneous signal at each given one of the plurality of side connection taps for coupling the corresponding symmetrically disposed tap to the output circuit with a polarity opposite to that of the signal at such given tap. By way of example, there is shown the coupling of the signal at the connection tap $N_b$ by way of an amplifier 56 or an inverter amplifier 57 and a gain-control amplifier 58 to one of a plurality of input circuits of a summing amplifier 59 having output terminals 60. An amplifier, suitable for use as the unit 58, is represented in FIG. 6 and described hereinafter.

The coupling of the instantaneous signal at the connection tap $N_b$ is under the control of the instantaneous signal appearing at the symmertically disposed connnection tap $N_a$. Included in the circuit to the tap $N_a$ is a linear transmission gate 61. This gate may be of conventional circuit configuration, for example as described in aforesaid Millman and Taub text, page 430, Figure 12–2. This gate permits linear transmission from its input circuit *b* to its output circuit *c* only during the occurrence of an enabling pulse at its input circuit *n*. The circuit from the connection tap $N_a$ further includes a polarity reversing circuit, specifically a bistable multivibrator 62, coupled to amplifier 56 and inverter amplifier 57, a polarity sensing means, such as a diode 64, and an inverter amplifier 63 providing a positive output signal at $q$ and $r$ in response to any negative input at $s$. The polarity reversing circuits comprise the amplifier 56 and the inverter amplifier 57, each having an input circuit connected to the tap $N_b$ and a second input circuit coupled to the bistable multivibrator 62, as described. The amplifier 56 and inverter amplifier 57 have a common output connection to the gain-control amplifier 58.

The circuit from the connecton tap $N_a$ further includes means responsive to the peak value of the signal at that tap for developing and storing a control signal. This means may be in the form of a full-wave rectifier consisting of diodes 64, 65 and inverter amplifier 63, a peak detector 68 and a zero-order hold circuit 69, which may be identical to the units 50 and 51, respectively, described above. The filter circuit further include variable-gain means included in each of the coupling means, for example the connection to the tap $N_b$, and responsive to the control signal developed from a corresponding symmetrically disposed tap for controlling the amplitude of the signal applied thereby to the output circuit. This variable-gain means may be the gain-control amplifier 58 coupled to the zero-order hold unit 69.

The system further includes means for adding all of the signals developed from the several connection taps, as described, and the signal appearing at the central tap 32. This latter signal is applied by way of an amplifier 70 to one of the input circuits of the summing amplifier 59, to which is also applied the gain-controlled signal from each of the connection taps by way of circuitry identical to that specifically described for applying the signal voltage appearing at the connection tap $N_b$.

The operation of the reciprocal filter described in connection with FIGS. 4 and 5 will be apparent in the light of the foregoing explanation and description. In brief, a reset pulse $g$, developed by the generator 55, triggers the multivibrator 54 to initiate the tap sensing operation; it also triggers the zero-hold circuit 51 and each of the zero-hold circuits 69 to discharge their respective time-constant circuits; and lastly, it resets each of the multivibrators 62 so that they all assume their normal state in which the output potential at their terminal $d$ is highly negative and so that the amplifier 56 is disabled and the inverter amplifier 57 is enabled. Initially, the voltage at the output terminal $a$ of the unit 54 is highly negative and disables the blocking oscillator 52. Upon the receipt of a reset pulse from the unit 55 however, the unit 54 is switched to its other state and the voltage at its output terminal $a$ becomes less negative, thereby enabling the blocking oscillaor 52. When a primary pulse is applied to the input terminals 28, it is detected in the peak detector 50 and applied to the zero-order hold circuit 51 and thence to one input of the biased amplifier 53. The bias thus established is such that an output signal $u$ will be developed only when the main pulse of the signal appearing at the central tap 32 is present at the second input of the biased amplifier 53. The primary pulse at the tap 32 is applied by way of biased amplifier 53 to blocking oscillator comparator 52 in conjunction with the signal $a$ from the unit 54. Since the bias for amplifier 53 is derived from the peak value of the first input signal during each test period, the sensing of the arrival of the peak of the signal at the central tap 32 can be effected even though the amplitude of the input signal may vary within wide limits from one test signal to the next. The blocking oscillator comparator 52 then develops a single positive pulse of a predetermined duration and this pulse is applied by way of its output terminal $n$ to each of the linear transmission gates, such as the gate 61, to enable them to repeat linearly the instantaneous voltages appearing at their respective taps and allowing the test signal along the delay line to be sampled at each tap for further processing. Each of the transmission gates 61 remains closed in the absence of the bias at the terminal $n$. The output pulse $n$ from the blocking oscillator comparator is also fed back to the multivibrator 54, switching it to its other state so that its output potential is returned to its normal high negative value.

The signal at the output terminal of the gate 61 is applied to the polarity sensing means comprising the inverter amplifier 63 and the oppositely poled diodes 64 and 65. If the signal at the tap $N_a$ is positive, the diode 64 blocks conduction and the potential at the output terminal $q$ of the inverter amplifier 63 is such that it does not switch the multivibrator 62 to the state opposite that to which it is set by the initial reset pulse $g$. As a consequence, the output terminal $d$ is highly negative, the amplifier 56 is blocked, and the inverter amplifier 57 is enabled so that the signal from the tap $N_b$ is translated to the summing amplifier 59 with a negative polarity, that is, a polarity opposite to that appearing at the tap $N_a$.

On the other hand, if the polarity of the signal at the tap $N_a$ is negative, then the signal output of the gate 61 passes through the diode 64 to the inverter amplifier 63, where it is repeated with uniform gain at the output terminal $r$ and where it develops an output at its terminal $q$ which switches the multivibrator 62 to its opposite state in which it develops a highly negative voltage at its output terminal $e$ so that the amplifier 56 is enabled while the inverter amplifier 57 is disabled. Thus, the signal appearing at the connection tap $N_b$ is translated through amplifier 56 to the summing amplifier with the same polarity, that is, opposite to the polarity of the signal at the tap $N_a$. The amplifier 56 and inverter amplifier 57 have the same gain and are effectively connected in parallel between the tap $N_b$ and the gain-control amplifier 58 but only one is permitted to conduct at a time so that their combination constitutes a provision for translating the signal from tap $N_b$ with either polarity.

The peak detector 68 and zero-order hold unit 69 act in the manner of the units 50 and 51, described above, to develop and store a control signal representative of the peak of the signal appearing at the tap $N_a$ while the gate 61 is open, which potential is applied by its output terminal $j$ to control the gain of amplifier 58. Thus, the signal from the tap $N_b$ is amplified by an amount determined by the peak amplitude of the test signal voltage appearing at the tap $N_a$ and the output signal $l$ of the amplifier 58 varies as the product of the peak value of the signal at the tap $N_a$ and the signal at the tap $N_b$ but is of a polarity opposite to that of the signal at the tap $N_a$.

The signals from all of the taps on either side of the central tap 32 are processed in the manner described in connection with the signal from the tap $N_b$ and all of these signals are added in the summing amplifier 59 and appear at the output terminals 60. As explained above, this procedure repreesnts an instrumentation of the first two terms of Equation 7 and a first approximation of the instrumentation of Equation 2.

It is emphasized that the reciprocal filters of FIGS. 4 and 5 have two basic operational states, a testing state and a signal-translating state. What has been described above is the operation of the circuitry in response to a test pulse from the matching filter 13 to "set up" the reciprocal filter for handling the translation of information signals. Due to the operation of the zero-order hold circuits 51 and 69, described above, the reciprocal filter, once set as described, holds the setting for the translation of subsequently received information signals. The time interval between the transmisison of successive test pulses and the development of the successive reset pulses by the unit 53 for effecting new set-ups of the reciprocal filter depends upon the time variability of the translating medium. This interval may be very small, such as a fraction of a second, or it may be a matter of several hours or even longer.

The gain-control amplifier 58 may be of any of several types well known in the art but there is shown, by way of example in FIG. 6, one amplifier suitable for this use.

The input signal $k$ is applied from input terminals 71 through a coupling condenser 72 and grid leak 73 to the control grid of a vacuum tube amplifier 74 which, by way of example, may be of the 6AS6 type. Suitable operating potentials are provided from a source +B for the anode and the screen grid and a source −C for the control grid. The control bias $j$ from the zero-order hold unit 69 is applied to the suppressor grid of the tube. The amplified output signal $l$ appears at the output terminals 75 and equals the product of the signal from the tap $N_b$ and the peak value of the signal appearing at the tap $N_a$ during the presence of a test signal distributed along the line 30.

Figure 7:
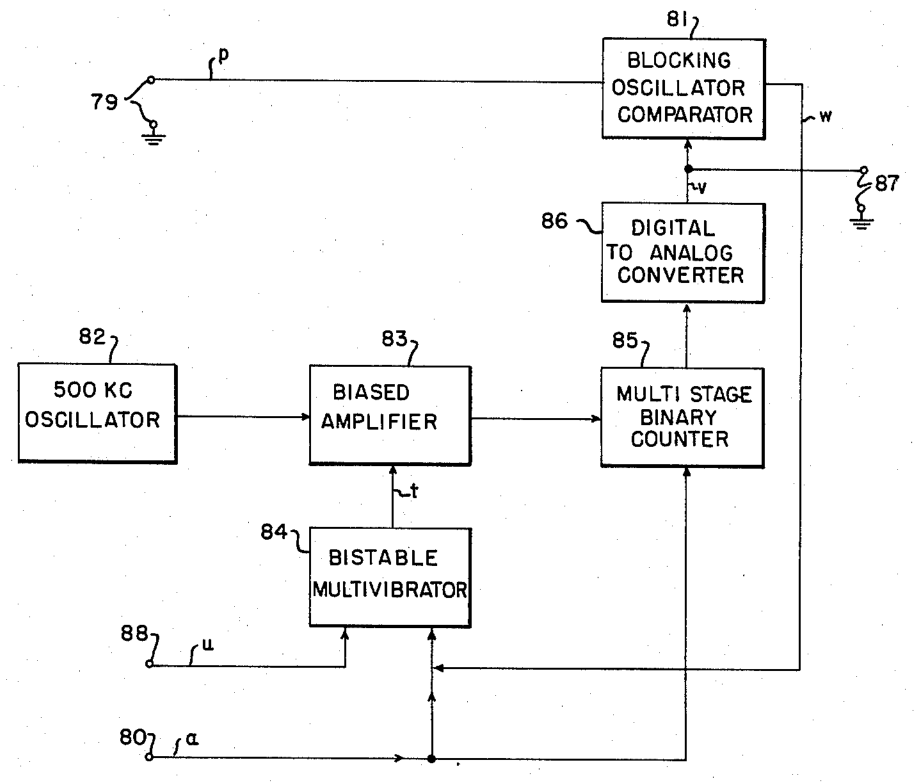

The zero-order hold circuit 51 may be of any of several types well known in the art but there is shown, by way of example in FIG. 7, one circuit suitable for this use. The input signal $p$ from peak detector 50 is applied via input terminals 79 to one input of a blocking oscillator comparator 81 which may be similar to the unit 52. A reset signal $a$ from bistable multivibrator 54 is applied via input terminal 80 to a multistage binary counter 85 and causes this counter to be set to a count of zero. The reset signal $a$ is also applied to a bistable multivibrator 84 and causes it to be set to a condition such that the output $t$ is highly negative. A binary counter 85 is excited from a high-frequency oscillator, such as a 500 kc. oscillator 82, through a biased amplifier 83. The output signal $t$ of the multivibrator 84 is applied to biased amplifier 83 and, when this signal is highly negative, as described, it blocks the output of oscillator 82 from the binary counter 85. An output signal $u$ from blocking oscillator comparator 52 is applied via input terminal 88 to bistable multivibrator 84 and causes it to switch state so that its output $t$ becomes more positive. Biased amplifier 83 now permits the 500 kc. oscillator signal to be fed to the binary counter 85. The output of this counter is decoded in a conventional digital-to-analog converter 86 and the resulting analog output signal $v$ is fed to the second input circuit of blocking oscillator comparator 81.

When signals $p$ and $v$ are equal in amplitude, blocking oscillator comparator 81 generates a signal $w$ which is applied to an input circuit of bistable multivibrator 84, causing it to be switched to its opposite state. Output $t$ again becomes highly negative and biased amplifier 83 no longer passes the 500 kc. oscillator signal to the binary counter 85, which retains the count. This count, when decoded in digital-to-analog converter 86, causes the output signal $v$ and, thus, output terminals 87, indefinitely to maintain a signal amplitude equal to that of input signal $p$ during the sampling period. The multistage binary counter 85 and the digital-to-analog converter 86 may be of any conventional types well known in the art, for example, the units illustrated and described in General Electric Transistor Manual, 5th edition, 1960, page 110, and Modern Transistor Circuits by John M. Carroll, McGraw-Hill, 1959, page 249, respectively.

The zero-order hold circuit just described is capable of holding its output signal a matter of hours or, in fact, indefinitely. If only a short holding period is required, this unit may take a simpler form, for example that illustrated and described in Sampled Data Systems by Julius Tou, McGraw-Hill, 1961, page 130.

What has been described so far applies to the operation of the first reciprocal filter 14 of FIG. 1 which develops an output signal represented by curve E in which the side pulses or ripples are substantially reduced. In order further to reduce these side pulses, the signal may be translated through the second reciprocal filter 15 having a transfer function $(1+R^2(p)\epsilon^{-2pm}$, as explained above, developing an output signal represented by curve F of FIG. 1 in which the amplitudes of the side pulses have negligible values. The combination of the reciprocal filters 14 and 15 represents an instrumentation of the first four terms of Equation 7.

While the operation of the communication system of FIG. 1 has been described with reference to a single input pulse represented by curve A, it has been discovered that the system operates satisfactorily also for a series of closely spaced repetitive pulses. While such a series of pulses, after dispersion and distortion in the transmission link between the transmitter 10 and the receiver 11, appear as an apparently meaningless jumble of overlapping main pulses and side pulses, the combination of the matching filter 13 and the reciprocal filter 14, or the filters 14 and 15 connected in cascade in the sequence shown, automatically unscrambles the repetitive pulses and restores the composite received signal to a satisfactory reproduction of the original series of pulses. Thereby, the data transmitting capabilities of the system are greatly increased.

While there has been described what is, at present, considered to be the preferred embodiment of the invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. An apparatus for translating a signal comprising a primary pulse and spurious minor side pulses with substantial suppression of said spurious pulses comprising:

(a) an input circuit for supplying a signal to be translated;

(b) an output circuit;

(c) a wave-signal transmission line coupled to said input circuit, having a predetermined time delay and provided with a central connection tap and a plurality of connection taps symmetrically arranged relative to said central tap;

(d) means for sensing the instantaneous signal voltage at said central tap and at each of said plurality of taps on one side thereof in response to the distribution of an input signal along said line;

(e) means responsive to the polarity of such instantaneous signal at each given one of said plurality of taps for coupling the corresponding symmetrically disposed tap to said output circuit with a polarity opposite to that of the signal at said given tap;

(f) and means for adding to the signals supplied to said output circuit by said last-named means the signal appearing at said central tap.

2. An apparatus for translating a signal comprising a primary pulse and spurious minor side pulses with substantial suppression of said spurious pulses comprising:

(a) an input circuit for supplying a signal to be translated;

(b) an output circuit;

(c) a wave-signal transmission line coupled to said input circuit, having a predetermined time delay and provided with a central connection tap and a plurality of connection taps symmetrically arranged relative to said central tap;

(d) means for sensing the instantaneous signal voltage at said central tap and at each of said plurality of taps on one side thereof in response to the distribution of an input signal along said line;

(e) means responsive to such instantaneous signal at each given one of said plurality of taps for coupling the corresponding symmetrically disposed tap to said output circuit with a gain varying with the negative value of the signal at said given tap;

(f) and means for adding to the signals supplied to said output circuit by said last-named means the signal appearing at said central tap.

3. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) means for sensing the instantaneous signal voltage at said central tap and at each of said plurality of taps on one side thereof in response to the distribution of an input signal along said line;
(e) means responsive to the polarity of such instantaneous signal at each given one of said plurality of taps for coupling the corresponding symmetrically disposed tap to said output circuit with a polarity opposite to that of the signal at said given tap;
(f) means for adding to the signals supplied to said output circuit by said last-named means the signal appearing at said central tap;
(g) and means for varying the gains of said couplings from each of said plurality of taps relative to that of the connection to said central tap by the same factor for optimum suppression of said spurious pulses.

4. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) means for sensing the instantaneous signal voltage at said central tap and at each of said plurality of taps on either side thereof in response to the distribution of an input signal along said line;
(e) means responsive to the polarity of such instantaneous signal at each given one of said plurality of taps for coupling the corresponding symmetrically disposed tap to said output circuit with a polarity opposite to that of the signal at said given tap;
(f) and means for adding to the signals supplied to said output circuit by said last-named means the signal appearing at said central tap.

5. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) a plurality of transmission gates individually coupled to each of said plurality of taps on one side thereof for sensing the instantaneous signal voltages thereat in response to the distribution of an input signal along said line;
(e) means responsive to the arrival of a primary pulse at said central tap for enabling said transmission gates;
(f) means responsive to the polarity of such instantaneous signal at each given one of said plurality of taps for coupling the corresponding symmetrically disposed tap to said output circuit with a polarity opposite to that of the signal at said given tap;
(g) and means for adding to the signals supplied to said output circuit by said last-named means the signal appearing at said central tap.

6. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) a plurality of transmission gates individually coupled to each of said plurality of taps on one side thereof for sensing the instantaneous signal voltages thereat in response to the distribution of an input signal along said line;
(e) a blocking oscillator responsive to the arrival of a primary pulse at said central tap for enabling said transmission gates for a predetermined interval;
(f) means responsive to the polarity of such instantaneous signal at each given one of said plurality of taps for coupling the corresponding symmetrically disposed tap to said output circuit with a polarity opposite to that of the signal at said given tap;
(g) and means for adding to the signals supplied to said output circuit by said last-named means the signal appearing at said central tap.

7. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) a plurality of transmission gates individually coupled to each of said plurality of taps on one side thereof for sensing the instantaneous signal voltages thereat in response to the distribution of an input signal along said line;
(e) means coupled to said input circuit and responsive to the peak value of the signal thereat for developing and storing a control signal;
(f) a transmission gate coupled to said central tap and controlled by said control signal to enable said other transmission gates only upon the arrival of a primary pulse at said central tap;
(g) means responsive to the polarity of such instantaneous signal at each given one of said plurality of taps for coupling the corresponding symmetrically disposed tap to said output circuit with a polarity opposite to that of the signal at said given tap;
(h) and means for adding to the signals supplied to said output circuit by said last-named means the signal appearing at said central tap.

8. An apparatus for translating a signal comprising a primary pulse and spurious minor side pulses with substantial suppression of said spurious pulses comprising:

(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) means for sensing the instantaneous signal voltage at said central tap and at each of said plurality of taps on one side thereof in response to the distribution of an input signal along said line;

(e) a two-state polarity-reversing circuit coupling each tap on the other side of said central tap to said output circuit;
(f) polarity-sensing means coupled to each of said signal-voltage sensing means for controlling that one of said polarity-reversing circuits coupled to a corresponding symmetrically disposed tap to apply to said output circuit a signal of a polarity opposite to that of the signal at said tap at which the signal voltage is sensed;
(g) and means for adding to the signals supplied to said output circuit by said last-named means the signal appearing at said central tap.

9. An apparatus for translating a signal comprising a primary pulse and spurious minor side pulses with substantial suppression of said spurious pulses comprising:
(a) an input circuit for supplying a signal to be translated;
(b) an output circuit;
(c) a wave-signal transmission line coupled to said input circuit, having a predetermined time delay and provided with a central connection tap and a plurality of connection taps symmetrically arranged relative to said central tap;
(d) means for sensing the instantaneous signal voltage at said central tap and at each of said plurality of taps on one side thereof in response to the distribution of an input signal along said line;
(e) means coupled to each of said side taps responsive to the peak value of the signal thereat for developing and storing a control signal;
(f) means responsive to the polarity of such instantaneous signal at each given one of said plurality of taps for coupling the corresponding symmetrically disposed tap to said output circuit with a polarity opposite to that of the signal at said given tap;
(g) variable-gain means included in each of said coupling means and responsive to said control signal developed from a corresponding symmetrically disposed tap for controlling the amplitude of the signal applied thereby to said output circuit;
(h) and means for adding to the signals supplied to said output circuit by said last-named means the signal appearing at said central tap.

10. A wave-signal translating channel for minimizing distortion of a signal distorted and dispersed by translation through a channel having a translating characteristic represented by the function h(t) comprising:
(a) an input circuit for supplying a distorted signal to be translated;
(b) a first wave-signal transmission line coupled to said input circuit and having a translating characteristic represented approximately by the function h(t), where $a$ is a constant, for converting an input signal to a signal comprising a primary pulse and spurious minor side pulses;
(c) a second wave-signal transmission line coupled to said first line, having a predetermined time delay and provided with a central connection tap and a plurality of connection taps symmetrically arranged relative to said central tap;
(d) means for sensing the instantaneous signal voltage at said central tap and at each of said plurality of taps on one side thereof in response to the distribution of an input signal along said line;
(e) means responsive to the polarity of such instantaneous signal at each given one of said plurality of taps for coupling the corresponding symmetrically disposed tap to said output circuit with a polarity opposite to that of the signal at said given tap;
(f) and means for adding to the signals supplied to said output circuit by said last-named means the signal appearing at said central tap.

11. A wave-signal translating channel for minimizing distortion of a signal distorted and dispersed by translation through a channel having a nonlinear amplitude-frequency translating characteristic but insubstantial phase distortion comprising:
(a) an input circuit for supplying a signal to be translated;
(b) a wave-signal transmission line coupled to said input circuit;
(c) circuit means coupled to said transmission line for effectively imparting thereto a transfer function represented approximately by the function $$1/(1+R(p))\epsilon^{-pm}$$

where $$R(p)=\sum_{v=-m}^{v=+m} a_v\epsilon^{-vp}$$

in which the coefficients $a_{-m}, a_{-m+1}, \ldots, a_{-1}, a_{-1}, \ldots, a_m$ are the amplitudes of the $2m$ undesired side lobes of the impulse response $h_2(t)$ of the distorting and dispering translation channel and where $p$ is the complex parameter of the Fourier or Laplace transform;
(d) and a utilization circuit coupled to said transmission line.

12. A wave-signal translating channel for minimizing distortion of a signal distorted and dispersed by translation through a channel having a nonlinear amplitude-frequency translating characteristic but insubstantial phase distortion comprising:
(a) an input circuit for supplying a signal to be translated;
(b) a wave-signal transmission line coupled to said input circuit;
(c) circuit means coupled to said transmission line for effectively imparting thereto a transfer function represented approximately by the function $$(1-R(p))\epsilon^{pm-}$$

where $$R(p)\sum_{v=-m}^{v=+m} a_v\epsilon^{-vp}$$

in which the coefficients $a_{-m}, a_{-m+1}, \ldots, a_{-1}, a_1, \ldots, a_m$ are the amplitudes of the $2m$ undesired side lobes of the impulse response $h_2(t)$ of the distorting and dispersing translation channel and where $p$ is the complex parameter of the Fourier or Laplace transform;
(d) and a utilization circuit coupled to said transmission line.

13. A wave-signal translating channel for minimizing distortion of a signal distorted and dispersed by translation through a channel having a nonlinear amplitude-frequency translating characteristic but insubstantial phase distortion comprising:
(a) an input circuit for supplying a signal to be translated;
(b) a plurality of $n$ wave-signal transmission lines connected to said input circuit in cascade;
(c) said successive transmission lines having transfer functions represented by the respective functions $$[(1-R(p))\epsilon^{-pm}, (1+R^2(p))\epsilon^{-2pm}, \ldots (1+R^{2(n-1)}(p))\epsilon^{-2(n-1)pm} \text{ for } n>1]$$

where $$R(p)=\sum_{v=-m}^{v=+m} a_v\epsilon^{-vp}$$

in which the coefficients $a_{-m}, a_{-m+1}, \ldots, a_{-1}, a_1, \ldots, a_m$ are the amplitudes of the $2m$ undesired side lobes of the impulse response $h_2(t)$ of the distorting and dispersing translation channel, where $p$ is the complex parameter of the Fourier or Laplace transform, and $n$ is the number of the variable term in the function;

(d) and an utilization circuit coupled to the last of said transmission lines.

14. A wave-signal translating channel for minimizing distortion of a signal distorted and dispersed by translation through a channel having a nonlinear amplitude-frequency translating characteristic but insubstantial phase distortion comprising:

(a) an input circuit for supplying a signal to be translated;

(b) a plurality of $n$ wave-signal transmission lines connected to said input circuit in cascade;

(c) said successive transmission lines having transfer functions the product of which is represented by the expression $$[1-R(p)+R^2(p)-R^3(p)\ \ldots\ +(-1)^nR^n(p)]\epsilon^{-nmp}$$

where the function $R(p)$ and the parameters $p$ and $m$ have the significance set forth in the specification and $n$ is the number of the variable term in the function;

(d) and a utilization circuit coupled to the last of said transmission lines.

15. A wave-signal translating channel for minimizing distortion of a signal distorted and dispersed by translation through a channel having a translating characteristic represented by the function $h(t)$ comprising:

(a) an input circuit for supplying a distorted signal to be translated;

(b) a first wave-signal transmission line coupled to said input circuit and having a translating characteristic represented approximately by the function $h(a-t)$, where $a$ is a constant, for converting an input signal to a signal comprising a primary pulse and spurious minor side pulses;

(c) a second wave-signal transmission line coupled to said first line having a transfer characteristic represented approximately by the function $$[1/(1+R(p)]\epsilon^{-pm}$$

where $$R(p)=\sum_{v=-m}^{v=+m} a_v\epsilon^{-vp}$$

in which the coefficients $a_{-m+1}, \ldots, a_1, \ldots a_m$ are the amplitudes of the $2m$ undesired side lobes of the over-all impulse response of the distorting and dispersing channel of impulse response $h(t)$ in cascade with said transmission line of impulse response $h(a-t)$ and where $p$ is the complex parameter of the Fourier or Laplace transform;

(d) and a utilization circuit coupled to said second transmission line.

16. A wave-signal translating channel for minimizing distortion of a signal distorted and dispersed by translation through a channel having a translating characteristic represented by the function $h(t)$ comprising:

(a) an input circuit for supplying a distorted signal to be translated;

(b) a first wave-signal transmission line coupled to said input circuit and having a translating characteristic represented approximately by the function $h(a-t)$, where $a$ is a constant, for converting an input signal to a signal comprising a primary pulse and spurious minor side pulses;

(c) a transmission line network coupled to said first line and consisting of first and second channels connected in parallel to said input circuit, said first channel including $n$ transmission lines connected in cascade each having a transfer function $\epsilon^{-pm}$ and said second channel including $n$ transmission lines connected in cascade each having a transfer function $-R(p)\epsilon^{-pm}$, where $$R(p)=\sum_{v=-m}^{v=+m} a_v\epsilon^{-vp}$$

in which the coefficients $$a_{-m}, a_{-m+1}, \ldots, a_{-1}, a_1, \ldots, a_m$$

are the amplitudes of the $2m$ undesired side lobes of the over-all impulse response of the distorting and dispersing channel of impulse response $h(t)$ in cascade with said transmission line of impulse response $h(a-t)$, where $p$ is the complex parameter of the Fourier or Laplace transform, and a unilateral coupling from each junction of said second channel to a corresponding junction of said first channel;

(d) and a utilization circuit to which the remote terminals of said channels are connected in parallel.

17. A wave-signal translating channel for minimizing distortion of a signal distorted and dispersed by translation through a channel having a nonlinear amplitude-frequency translating characteristic but insubstantial phase distortion comprising:

(a) an input circuit for supplying a signal to be translated;

(b) a wave-signal transmission line coupled to said input circuit;

(c) circuit means coupled to said transmission line for effectively imparting thereto a transfer function represented approximately by the function $$[1-g_0R(p)]\epsilon^{-pm}$$

where the gain factor $g_0$ is represented by the expression:

$$\frac{\int_0^\infty H_{20}^2(p)R^2(p)(1+R(p))df}{\int_0^\infty H_{20}^2(p)R^2(p)(1+R(p))^2df}$$

where the function $H_{20}(p)$ is the Fourier or Laplace transform of the main desired pulse $h_{20}(t)$ of the distorting and dispersing channel, and $R(p)$ is defined as $$R(p)=\sum_{v=-m}^{v=+m} a_v\epsilon^{-vp}$$

in which the coefficients $$a_{-m}, a_{-m+}{}^1, \ldots, a_{-1}, a_1, \ldots, a_m$$

are the amplitudes of the $2m$ undesired side lobes of the impulse response $h_2(t)$ of the distorting and dispersing channel, and where $p$ is the complex parameter of the Fourier or Laplace transform;

(d) and a utilization circuit coupled to said transmission line.

18. A wave-signal translating channel for minimizing distortion of a signal distorted and dispersed by translation through a channel having a nonlinear amplitude-frequency translating characteristic but insubstantial phase distortion comprising:

(a) an input circuit for supplying a signal to be translated;

(b) a plurality of $n$ wave-signal transmission lines connected to said input circuit in cascade;

(c) said successive transmission lines having transfer functions represented by the respective functions $$[(1-g_{01}R_1(p))\epsilon^{-pm}, (1+g_{02}R_2(p))\epsilon^{-2pm}, \ldots (1+g_{0n}R_{2^{(n-1)}}(p))\epsilon^{-2^{(n-1)}pm} \text{ for } n>1]$$

where $$R(p)\sum_{v=-m}^{v=+m} a_v\epsilon^{-vp}$$

in which the coefficients $$a_{-m}, a_{-m+1}, \ldots, a_{-1}, a_1, \ldots, a_m$$

are the amplitudes of the $2m$ undesired side lobes of the impulse response $h_2(t)$ of the distorting and dispersing translation channel and where $p$ is the complex parameter of the Fourier or Laplace transform, $n$ is the number of the variable term in the function, and the gain factor of the $n$th term $g^{on}$ is represented by the expression:

$$\frac{\int_0^\infty H_{2n}^2(p)R^2(p)(1+R(p))df}{\int_0^\infty H_{2n}^2(p)R^2(p)(1+R(p))^2 df}$$

where the function $H_2^{n2}(p)$ is the Fourier or Laplace transform of the main desired pulse $h_2(t)$ of the distorting and dispersing channel and where $p$ is the complex parameter of the Fourier or Laplace transform;

(d) and a utilization circuit coupled to the last of said transmission lines.

19. A wave-signal translating channel for minimizing distortion of a signal distorted and dispersed by translation through a channel having a translating characteristic represented by the function $h(t)$ comprising:

(a) an input circuit for supplying a distorted signal to be translated;

(b) a first wave-signal transmission line coupled to said input circuit and having a translating characteristic represented approximately by the function $h(a-t)$, where $a$ is a constant, for converting an input signal to a signal comprising a primary pulse and spurious minor side pulses;

(c) a transmission line network coupled to said first line and consisting of first and second channels connected in parallel to said input circuit, said first channel including $n$ transmission lines connected in cascade each having a transfer function $\epsilon^{-pm}$ and said second channel including $n$ transmission lines connected in cascade each having a transfer function $-R(p)\epsilon^{-pm}$, $$R(p) \sum_{v=-m}^{v=+m} a_v \epsilon^{-vp}$$

in which the coefficients $$a_{-m}, a_{-m+1}, \ldots, a_{-1}, a_1, \ldots, a_m$$

are the amplitudes of the 2m undesired side lobes of the impulse response $h_2(t)$ of the distorting and dispersing translation channel and where $p$ is the complex parameter of the Fourier or Laplace transform, and a unilateral coupling from each junction of said second channel to a corresponding junction of said first channel, said couplings having gains $g_1, g_2 \ldots g_n$ proportioned relative to the circuit parameters to yield a least mean square residual ripple;

(d) and a utilization circuit to which the remote terminals of said channels are connected in parallel.

References Cited by the Examiner

UNITED STATES PATENTS

| | | | |
|---|---|---|---|
| 2,982,853 | 5/61 | Price et al. | 328—165 |
| 2,985,834 | 5/61 | Treadwell | 328—151 |
| 3,080,557 | 3/63 | Davis et al. | 328—108 |
| 3,114,884 | 12/63 | Jakowatz | 328—165 |

JOHN W. HUCKERT, *Primary Examiner.*

ARTHUR GAUSS, *Examiner.*

UNITED STATES PATENT OFFICE
CERTIFICATE OF CORRECTION

Patent No. 3,206,688 September 14, 1965

Michael J. Di Toro

It is certified that error appears in the above identified patent and that said Letters Patent are hereby corrected as shown below:

Column 2, line 71, "frontier" should read -- Fourier --. Column 6, line 46, "((1-g)-gH(p))" should read -- ((1-g)-gR(p)) --; line 68, "R(p)" should read -- $R_2(p)$ --. Column 16, line 37, "$\varepsilon^{pm-}$" should read -- $\varepsilon^{-pm}$ --. Column 17, line 40, "$[1/(1+R(p)]\leftarrow^{-pm}$" should read -- $[1/(1+R(p)]\varepsilon^{-pm}$ --. Column 19, lines 8 to 12, the formula should appear as shown below:

$$\frac{\int_0^\infty H_{20}^{\;2}(p)R_n^{\;2}(p)(1+R_n(p))df}{\int_0^\infty H_{20}^{\;2}(p)R_n^{\;2}(p)(1+R_n(p))^2 df}$$

same column 19, line 13, "$H_2^{n2}(p)$" should read -- $H_{20}^{\;2}(p)$ --.

Signed and sealed this 31st day of March 1970.

(SEAL)
Attest:

EDWARD M.FLETCHER,JR. WILLIAM E. SCHUYLER, JR.
Attesting Officer Commissioner of Patents

Disclaimer 3,206,688.—*Michael J. DiToro*, Massapequa, N.Y. APPARATUS FOR CORRECTING DISTORTION IN WAVE-SIGNAL TRANSLATING CHANNELS. Patent dated Sept. 14, 1965. Disclaimer filed May 18, 1973, by the assignee, *General Signal Corporation*.

Hereby enters this disclaimer to claim 11 of said patent.

[*Official Gazette October 30, 1973.*]